US012064991B2

(12) United States Patent
Sakai et al.

(10) Patent No.: US 12,064,991 B2
(45) Date of Patent: Aug. 20, 2024

(54) IMAGE FORMING DEVICE AND IMAGE FORMING METHOD

(71) Applicant: Konica Minolta, Inc., Tokyo (JP)

(72) Inventors: Tetsuya Sakai, Toyokawa (JP); Yoshinori Tsutsumi, Toyokawa (JP); Kenji Tsuru, Toyokawa (JP); Munenori Nakano, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 534 days.

(21) Appl. No.: 16/924,566

(22) Filed: Jul. 9, 2020

(65) Prior Publication Data

US 2021/0008921 A1 Jan. 14, 2021

(30) Foreign Application Priority Data

Jul. 9, 2019 (JP) ................................ 2019-127654

(51) Int. Cl.

*B44C 1/14* (2006.01)
*B41F 16/00* (2006.01)
*B41M 3/00* (2006.01)

(52) U.S. Cl.

CPC .......... *B44C 1/145* (2013.01); *B41F 16/0026* (2013.01); *B41M 3/008* (2013.01)

(58) Field of Classification Search

None
See application file for complete search history.

(56) References Cited

U.S. PATENT DOCUMENTS

| | | | | |
|---|---|---|---|---|
| 2010/0086753 A1* | 4/2010 | Johnson | ................. | B41M 7/009 428/203 |
| 2016/0129682 A1 | 5/2016 | Abergel | | |
| 2018/0215184 A1* | 8/2018 | Beech | ...................... | B41M 3/14 |

FOREIGN PATENT DOCUMENTS

| | | | |
|---|---|---|---|
| JP | 2005501761 | A | 1/2005 |
| JP | 2011215615 | A | 10/2011 |
| JP | 2012181481 | A | 9/2012 |
| JP | 2016528064 | A | 9/2016 |
| JP | 2018173524 | A | 11/2018 |
| JP | 2020519034 | A | 6/2020 |
| WO | 2018162669 | A1 | 9/2018 |

OTHER PUBLICATIONS

JPO Notice of Reasons for Refusal for corresponding JP Application No. 2019-127654; Issued on Mar. 28, 2023.

* cited by examiner

*Primary Examiner* — Alejandro Valencia
(74) *Attorney, Agent, or Firm* — CANTOR COLBURN LLP

(57) ABSTRACT

An image forming device comprises: a receiving part that receives image data containing first image data relating to a black and white image and second image data relating to a foil image; a carrying path along which a recording medium is carried in a predetermined direction; an inkjet printing part, arranged on the carrying path, injects an ink based on the first image data to the recording medium, and forms the black and white image or the color image on the recording medium; a toner image printing part, arranged on the carrying path, forms the toner image for adhesion based on the second image data, and transfers the toner image to the recording medium; and a foil image forming part, arranged on the carrying path, enables the toner image transferred to the recording medium to melt and attaches the foil to the melted toner image to form the foil image.

7 Claims, 10 Drawing Sheets

IMAGE FORMING DEVICE AND IMAGE FORMING METHOD

CROSS REFERENCE TO RELATED APPLICATIONS

The present invention claims priority under 35 U.S.C. § 119 Japanese patent application No. 2019-127654 filed on Jul. 9, 2019, the entire content of which is incorporated herein by reference.

BACKGROUND

Technological Field

The present invention relates to an image forming device and an image forming method. One or more embodiments of the present invention more specifically relate to a technique for printing a black and white image or a color image and for forming a foil pressed image (hereafter, foil image) on a recording medium such as a printing sheet.

Description of the Related Art

In the commercial printing field, for example, printed outputs whereon a foil image is formed have been produced by sticking a foil such as a gold foil to a recording medium. As one of ordinary ways to form the foil image on the printing medium, a printing method that discharges ink or varnish to a surface of the recording medium to apply adhesion to the surface of the recording medium and presses a foil film such as the gold foil to the adhesive part based on an inkjet system. This known technique is introduced for example in Japanese Translation of PCT International Application Publication No. JP 2016-528064 A.

In order to produce a printed output whereon the foil image is formed using the aforementioned ordinary method, it is required to separate a step to discharge ink or varnish to a surface of the recording medium and form the foil image in the inkjet system and a step to form a black and white image or a color image which is different from the foil image on the surface of the recording medium. Those steps should be separately processed. This may cause a decrease in a printing speed.

SUMMARY

One or more embodiments provide an image forming device and an image forming method that are enabled to produce a printed output whereon a foil image is formed more effectively than an ordinary way.

In one aspect, the present invention is directed to an image forming device.

According to an aspect of the present invention, the image forming device comprises: a receiving part that receives image data containing first image data relating to a black and white image and second image data relating to a foil image; a carrying path along which a recording medium is carried in a predetermined direction; an inkjet printing part, arranged on the carrying path, injects an ink based on the first image data to the recording medium carried along the carrying path, and forms the black and white image or the color image on the recording medium; a toner image printing part, arranged on the carrying path, forms the toner image for adhesion based on the second image data, and transfers the toner image to the recording medium; and a foil image forming part, arranged on the carrying path, enables the toner image transferred to the recording medium to melt and attaches the foil to the melted toner image to form the foil image.

In another aspect, the present invention is directed to an image forming method to form a black and white image or a color image on a recording medium and to form a foil image on the recording medium at time the recording medium is being carried along a predetermined carrying path.

According to an aspect of the present invention, the image forming method is applied at an image forming device. The method comprises: receiving image data containing first image data relating to the black and white image or the color image and second image data relating to a foil image; injecting an ink based on the first image data and forming the black and white image or the color image on the recording medium at time the recording medium passes through a first position on the carrying path; forming a toner image for adhesion based on the second image data and transferring the toner image to the recording medium at time the recording medium passes through a second position on the carrying path; and enabling the toner image transferred to the recording medium to melt and attaching the foil to the melted toner image to form the foil image at time the recording medium passes through a third position on the carrying path.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

First Embodiment

Figure 1:
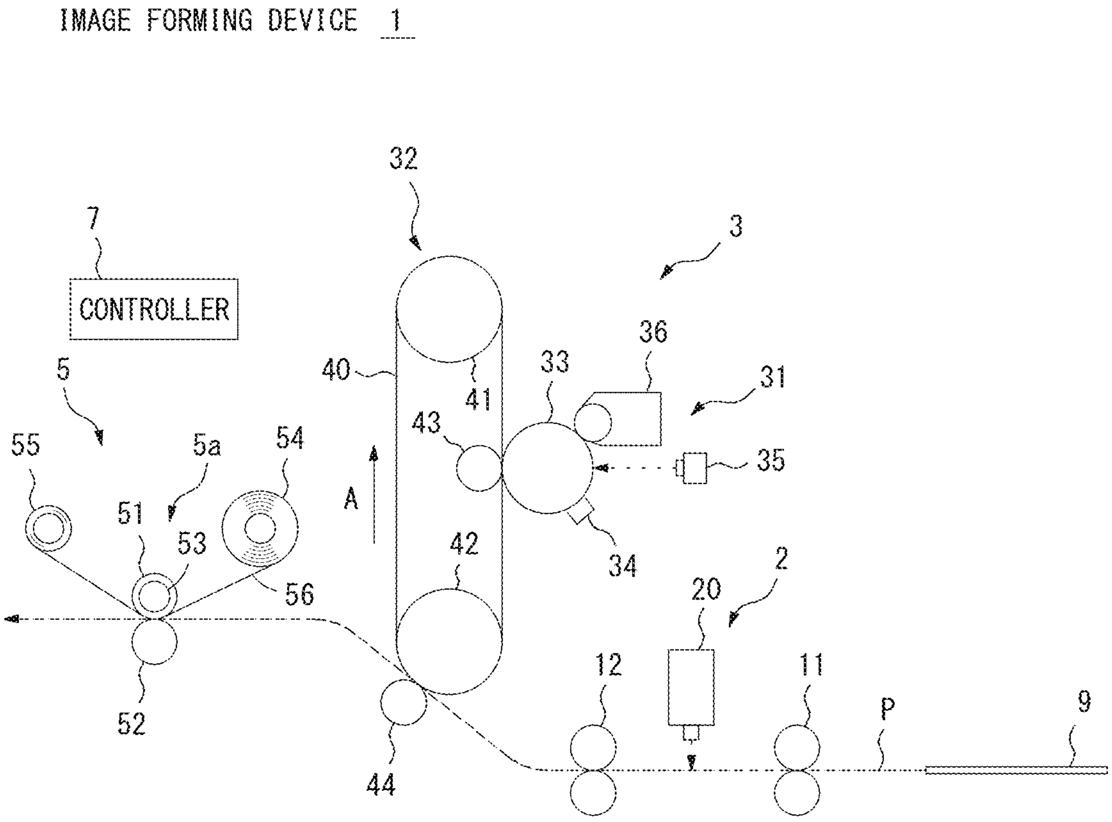
FIG. 1 illustrates an exemplary structure of an image forming device in which a first embodiment of the present invention may be practiced.

FIG. 1 illustrates an exemplary structure of an image forming device 1 in which the first embodiment of the present invention may be practiced. The image forming device 1 of FIG. 1 includes a carrying path P to carry a sheet type recording medium 9 such as a printing sheet. An inkjet printing unit 2, a toner image printing unit 3 and a foil image forming unit 5 are arranged along the carrying path P. The image forming device 1 includes a controller 7 to control printing operations. The image forming device 1 of the first embodiment is provided with the inkjet printing unit 2, the toner image printing unit 3 and the foil image forming unit 5 arranged in order from an upstream side of the carrying path P.

Multiple pairs of rollers 11 and 12 are arranged in the carrying path P. Those multiple pairs of rollers 11 and 12 are rotationally driven. The recording medium 9 is sandwiched by a nip part between each pair of rollers 11 and 12. When each pair of rollers 11 and 12 rotate, the recording medium 9 is carried toward downstream side of the carrying path P. In FIG. 1, the recording medium 9 is carried from the right side to the left side.

The inkjet printing unit 2 prints a black and white image or a color image based on an inkjet system on the recording medium 9 carried along the carrying path P. The inkjet printing unit 2 includes an inkjet head 20. The inkjet head 20 is enabled to inject multiple colors of inks such as Y (yellow), M (magenta), C (cyan) and K (black), for example. The inkjet head 20 is enabled to form a black and white image or a color image on the recording medium 9. The inkjet head 20 injects each color of the ink from a direction at right angle to a surface of the recording medium 9 carried on the carrying path P. The inkjet head 20 is arranged at a predetermined position in downstream side of the pair of rollers 11 to face, for example. When the recording medium 9 passes through the predetermined position carried along the carrying path P, the inkjet head 20 injects the ink and prints a black and white image or a color image on the surface of the recording medium 9.

The toner image printing unit 3 transfers the toner image to the recording medium 9 carried along the carrying path P based on electrographic system. The toner image printing unit 3 includes an image forming unit 31 and a transfer unit 32.

The image forming unit 31 includes a photoreceptor 33 which is constructed as an image carrier. An electrifying unit 34, an exposure unit 35 and a developing unit 36 are arranged around the photoreceptor 33. The photoreceptor 33 is cylindrical in shape. The photoreceptor 33 has a photoconductive photosensitive layer on its outer peripheral surface. The photoreceptor 33 rotates in a predetermined direction (counterclockwise direction) due to a driving source (such as a motor), which is not illustrated in FIG. 1. The photosensitive layer of the rotating photoreceptor 33 is charged to a negative polarity by the electrifying unit 34. The exposure unit 35 is constructed by a semiconductor laser, for instance, and exposes the surface of the charged photoreceptor 33. To be more specific, the exposure unit 35 irradiates the surface of the photoreceptor 33 with laser light corresponding to the image data to form a latent image on the surface of the photoreceptor 33. The developing unit 36 contains a developer including a toner with a certain color and a carrier. The developing unit 36 attaches the toner to the latent image to form the toner image on the surface of the photoreceptor 33.

The transfer unit 32 includes an intermediate transfer belt 40, a driven roller 41, a driving roller 42, a primary transfer roller 43 and a secondary transfer roller 44. The transfer unit 32 may be provided with a belt cleaner, which is not illustrated in FIG. 1, besides the aforementioned parts. The intermediate transfer belt 40 is formed from an endless belt, for example. The driven roller 41 and the driving roller 42 apply certain tension to the intermediate transfer belt 40 and the intermediate transfer belt 40 is wrapped around the driven roller 41 and the driving roller 42. The rotation of the driving roller 42 enables a circulating movement of the intermediate transfer belt 40 in an arrow F1 direction at a certain speed. The primary transfer roller 43 is arranged at a position facing the photoreceptor 33 across the intermediate transfer belt 40. The primary transfer roller 43 is enabled to advance/retreat to and from the photoreceptor 33 so that it may press the intermediate transfer belt 40 against the surface of the photoreceptor 33 or separate the intermediate transfer belt 40 from the surface of the photoreceptor 33. Once the intermediate transfer belt 40 is pressed against the surface of the photoreceptor 33 by the primary transfer roller 43, the toner image formed on the surface of the photoreceptor 33 is primarily transferred to the intermediate transfer belt 40 due to the electrostatic force applied by the primary transfer roller 43. The toner image primarily transferred to the intermediate transfer belt 40 is moved in response to the circulating movement of the intermediate transfer belt 40. The secondary transfer roller 44 is arranged at a position facing the driving roller 42 across the carrying path P. The toner image primarily transferred to the intermediate transfer belt 40 is pressed against the surface of the recording medium 9 at a position of the secondary transfer roller 44, and is secondarily transferred to the surface of the recording medium 9 due to the electrostatic force applied by the secondary transfer roller 44.

The foil image forming unit 5 includes an electrophotographic fixing unit 5*a*. The fixing unit 5*a* includes a heating roller 51 and a pressing roller 52. The fixing unit 5*a* passes the recording medium 9 through a nip part between the heating roller 51 and the pressing roller 52 so that the toner image transferred to the surface of the recording medium 9 by the toner image printing unit 3 is fixed to the recording medium 9. The heating roller 51 and the pressing roller 52 are in a pair. The heating roller 51 is provided with a heater 53, which is a heating source, inside the roller. The heating roller 51 is heated and its temperature raises up to a predetermined temperature. The pressing roller 52 is arranged facing the heating roller 51 across the carrying path P. The pressing roller 52 is energized by an elastic member which is not illustrated in FIG. 1 toward the heating roller 51.

The foil image forming unit 5 includes a foil supplying roller 54 and a winding roller 55. A long sheet material 56 that carries a foil such as a gold foil is wound around the foil supplying roller 54. The winding roller 55 winds the sheet material 56 supplied from the foil supplying roller 54. The sheet material 56 sent out from the foil supplying roller 54 is wound around the winding roller 55 through the nip part between the heating roller 51 and the pressing roller 52. To be more specific, the sheet material 56 that carries the foil is held by the nip part between the heating roller 51 and the pressing roller 52 and inserted into the fixing unit 5*a*. The foil image forming unit 5 with the aforementioned structure is enabled to transfer the foil to a part to which the toner image is transferred on the surface of the recording medium 9 when the recording medium 9 passes through.

Figure 2:
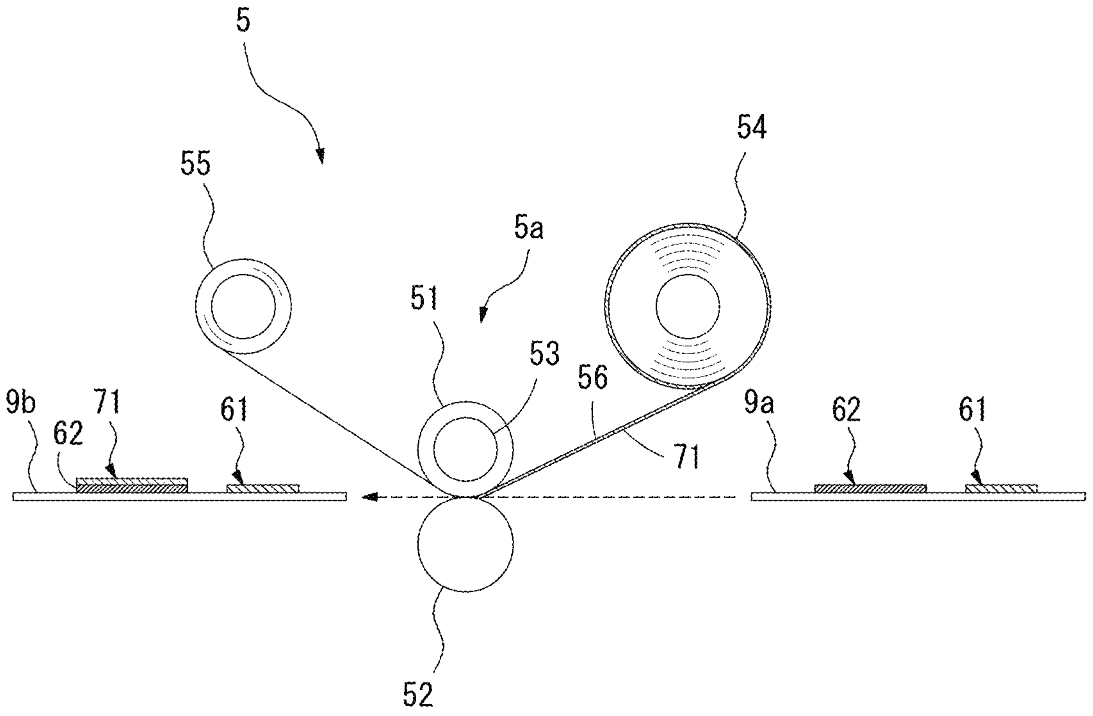
FIG. 2 illustrates an enlarged foil image forming unit.

FIG. 2 illustrates an enlarged foil image forming unit 5. An ink 61 injected from the inkjet printing unit 2 and the toner image transferred by the toner image printing unit 3 are provided with the surface of the recording medium 9 passing through the toner image printing unit 3. The recording medium 9 passes through the fix unit 5*a* of the foil image forming unit 5, which is the nip part between the heating roller 51 and the pressing roller 52. The heating process and the pressing process are conducted on the recording medium 9 at the passage through the nip part. A toner 62 transferred to the recording medium 9 melts due to the heating process so that the melted toner 62 gives an adhesion that adheres the foil to the recording medium 9. To be more specific, the first embodiment focuses on the adhesion produced when the toner 62 melts, and uses the toner 62 as a foil adhering material.

A foil 71 carried by the sheet material 56 is in contact with the surface of the recording medium 9 at the nip part between the heating roller 51 and the pressing roller 52. Once the foil 71 is in contact with the surface of the recording medium 9, the foil 71 is pressed to the toner 62 which has an adhesion so that the foil 71 is adhered to the toner 62. The foil 71 adhered to the toner 62 due to the pressing process is peeled off from the sheet material 56 and transferred to the surface of the recording medium 9. The foil 71 is not transferred to the part to which no toner image is attached on the surface of the recording medium 9. The remaining foil 71 on the sheet material 56 is collected by the winding roller 55. The foil image forming unit 5 also has a function to quickly dry the ink 61.

The image forming device 1 of the first embodiment forms a black and white image or a color image on the surface of the recording medium 9 at time the recording medium 9 is carried along the carrying path P. The image forming device 1 also forms a foil image whereto the foil 71 is transferred. To be more specific, the image forming device 1 processes an operation to form the black and white image or the color image and an operation to form the foil image as a series of operations, resulting in improvement in printing efficiency compared to the ordinary way.

Figure 3:
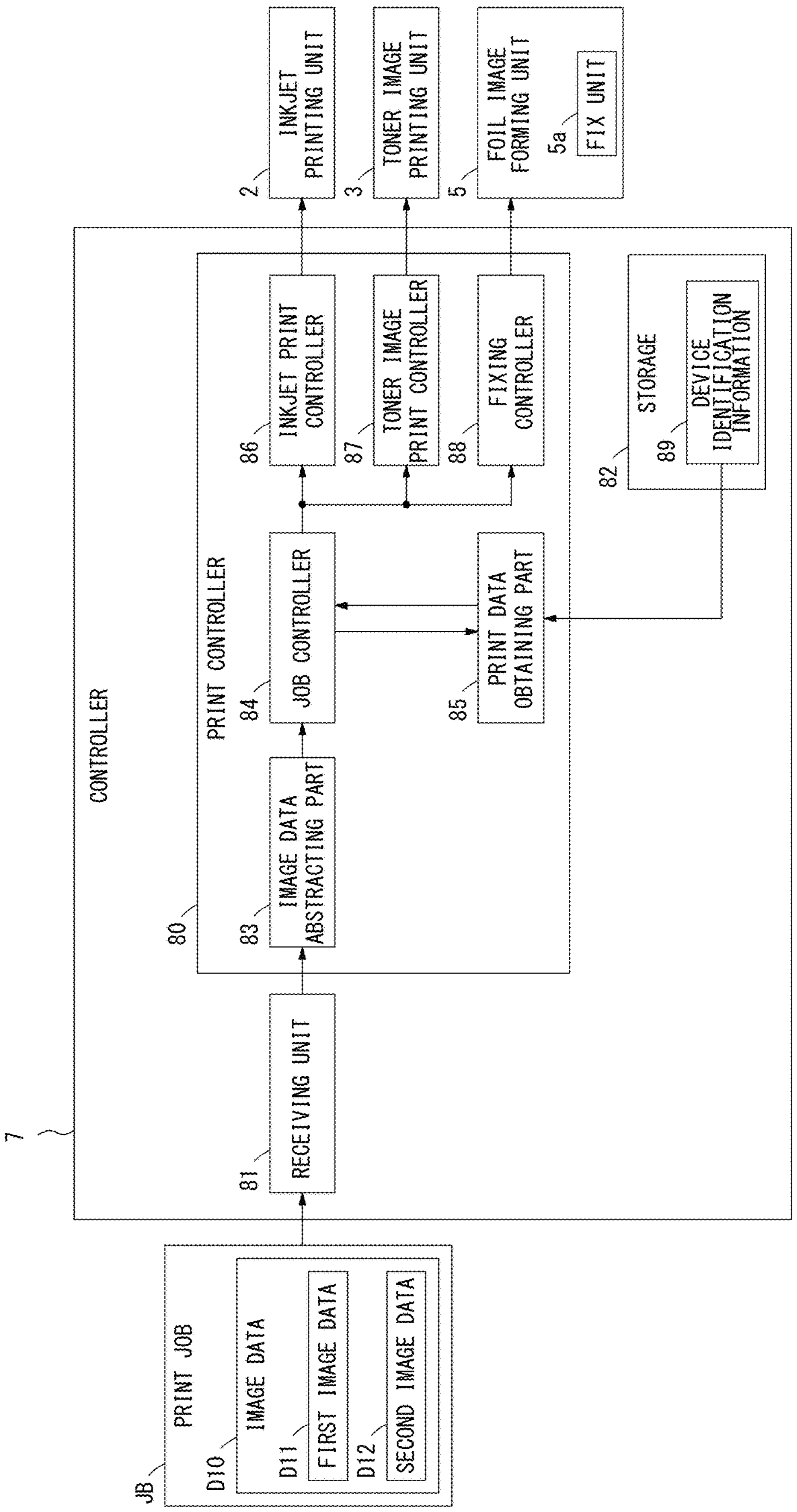
FIG. 3 illustrates a block diagram showing an example of a detailed structure of a controller.

FIG. 3 illustrates a block diagram showing an example of a detailed structure of the controller 7. The controller 7 mainly includes a print controller 80, a receiving unit 81 and a storage 82. The print controller 80 is an arithmetic processor which is formed from a CPU, for instance. The receiving unit 81 is formed from a communication interface connected to a network such as LAN, for example, and receives a print job JB. The storage 82 is a nonvolatile storage device such as a hard disk drive (HDD) or a solid-state drive (SSD), for example. A program executed by the CPU that forms the print controller 80 and/or a variety of information is stored in the storage 82. Device identification information 89 to identify the image forming device 1, for example, is stored in advance in the storage 82.

Upon receiving the print job JB over the network, the receiving unit 81 outputs the received print job JB to the print controller 80. The print job JB received by the receiving unit 81 contains image data D1 to print. The image data D10 contains first image data D11 relating to the black and white image or the color image and second image data D12 relating to the foil image. After receiving the print job JB, the receiving unit 81 outputs the image data D10 containing the first image data D11 relating to the black and white image or the color image and the second image data D12 relating to the foil image to the print controller 80.

The CPU reads and executes the program in the storage 82 so that the print controller 80 serves as an image data abstracting part 83, a job controller 84, a print data obtaining part 85, an inkjet print controller 86, a toner image print controller 87 and a fixing controller 88.

When the print job JB is received by the receiving unit 81, the image data abstracting part 83 abstracts the first image data D11 and the second image data D12 in the print job JB. The image data abstracting part 83 outputs the abstracted first image data D11 and second image data D12 to the job controller 84.

The job controller 83 controls printing operations on the recording medium 9 based on the image data D10 in the print job JB. The job controller 84 controls the carrying operation of the recording medium 9. Also, the job controller 84 controls the printing process of the black and white image or the color image on the recording medium 9, the forming process of the toner image and the heating process and pressing process by the film image forming unit 5 to be appropriately performed by bringing the inkjet print controller 86, the toner image print controller 87 and the fixing controller 88 into operation under the synchronized condition. The job controller 84, for example, outputs the first image data D11 relating to the black and white image or the color image to the inkjet print controller 86, and enables the inkjet printing unit 2 to perform the printing operation of the black and white image or the color image. The job controller 84 controls the fixing controller 88 so that the heating process and the pressing process are conducted on the recording medium 9 carried along the carrying path P.

The job controller 84 performs the above-described controls so that the recording medium 9 is carried along the carrying path P. The black and white image or the color image based on the first image data D11 is printed on the recording medium 9 when the recording medium 9 passes through the first position in which the inkjet printing unit 2 is arranged. The toner image based on the second image data D12 is transferred to the recording medium 9 when the recording medium 9 passes through the second position in which the toner image printing unit 3 is arranged. The foil 71 is transferred to the toner image and the foil image is formed on the recording medium 9 when the recording medium 9 passes through the third position in which the foil image forming unit 5 is arranged. The image forming device 1 is enabled to perform a series of operations including printing of the black and white image or the color image and the forming of the foil image by the single carrying of the recording medium 9 along the carrying path P.

In the printing operation on the recording medium 9, the image forming device 1 enables the nip part between the heating roller 51 and the pressing roller 52 to hold the sheet material 56 as described above so that the foil image can be formed during the carrying of the recording medium 9. If it is not necessary to form the foil image on the surface of the recording medium 9, the image forming device 1 is enabled to remove the sheet material 56 from the fix unit 5*a*. More specifically, the sheet material 56 can be released from the nip part between the heating roller 51 and the pressing roller 52. The image forming device 1 is enabled to form an image on the recording medium 9 after removing the sheet material 56 from the fix unit 5*a*.

Figure 4A:
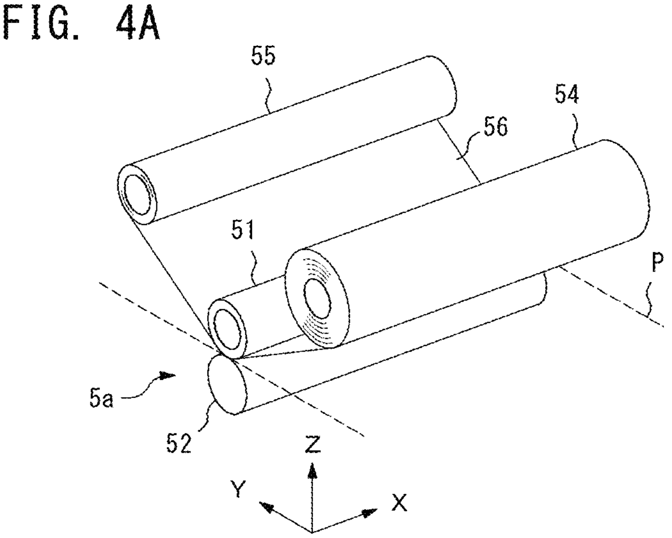
FIG. 4A, FIG. 4B and FIG. 4C illustrate an example when a sheet material is removed from a nip part between a heating roller and a pressing roller.
Figure 4B:
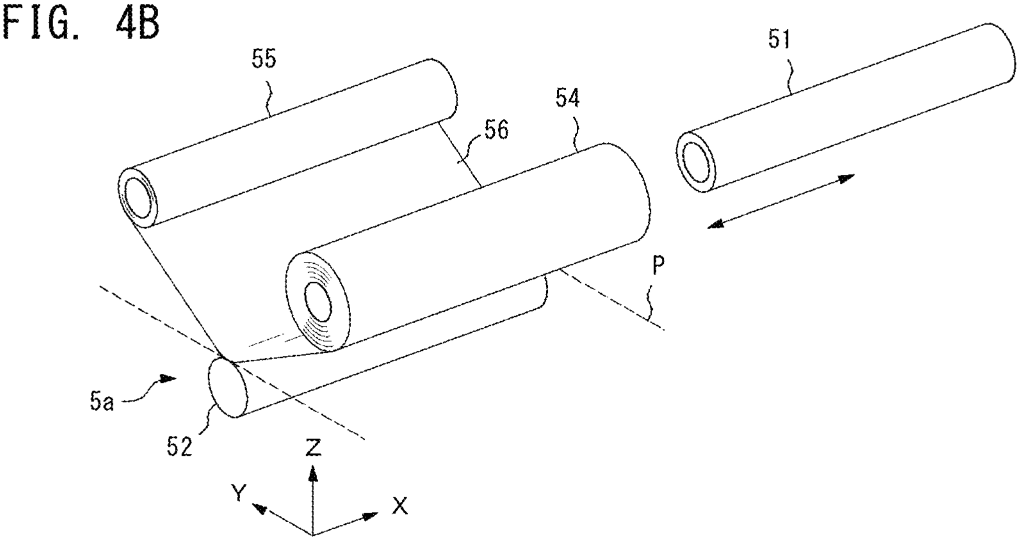

FIGS. 4A and 4B illustrate an example where the sheet material 56 is removed from the nip part between the heating roller 51 and the pressing roller 52. FIG. 4A illustrates a state that the sheet material 56 sent out from the foil supplying roller 54 is hold by the nip part between the heating roller 51 and the pressing roller 52. The image forming device 1 of the first embodiment is enabled to move the heating roller 51 in a X direction at right angle to the carrying direction of the recording medium 9. The heating roller 51 is moved in the X direction so that there is a space above the sheet material 56 as illustrated in FIG. 4B. The bent sheet material 56 is wound up by either the foil supplying roller 54 or the winding roller 55. After elimination of the deflection of the sheet material 56, the heating roller 51 is moved in the –X direction and the heating roller 51 is back to the position facing the pressing roller 52. As a result, the sheet material 56 is removed from the nip part between the heating roller 51 and the pressing roller 52 as illustrated in FIG. 4C.

Figure 4C:
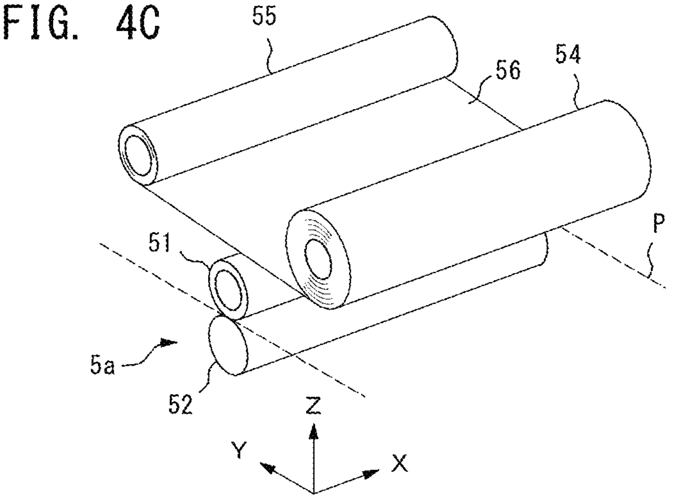

The job controller 84 is enabled to form an image on the recording medium 9 based on the image data D10 in the print job JB even when the sheet material 56 is removed from the nip part between the heating roller 51 and the pressing roller 52 as illustrated in FIG. 4C.

It is assumed, for example, the image data D10 only contains the first image data D11. In this case, the job controller 84 may terminate the operation of the toner image printing unit 3 and only enable the inkjet printing unit 2 to form the black and white image or the color image on the recording medium 9 to print. In this case, the job controller 84 separates the secondary transfer roller 44 from the intermediate transfer belt 40, for example, so that the recording medium 9 carried along the carrying path P is not in contact with the intermediate transfer belt 40. The job controller 84 terminates the operation of the toner image printing unit 3. When the recording medium 9 passes through the foil image forming unit 5, the job controller 84 may not conduct the heating process and the pressing process on the recording medium 9. The job controller 84, for instance, terminates the heater 53 of the hearing roller 51 and separates the pressing roller 52 from the heating roller 51 to enable the heating process and the pressing process are not conducted on the recording medium 9.

Figure 5:
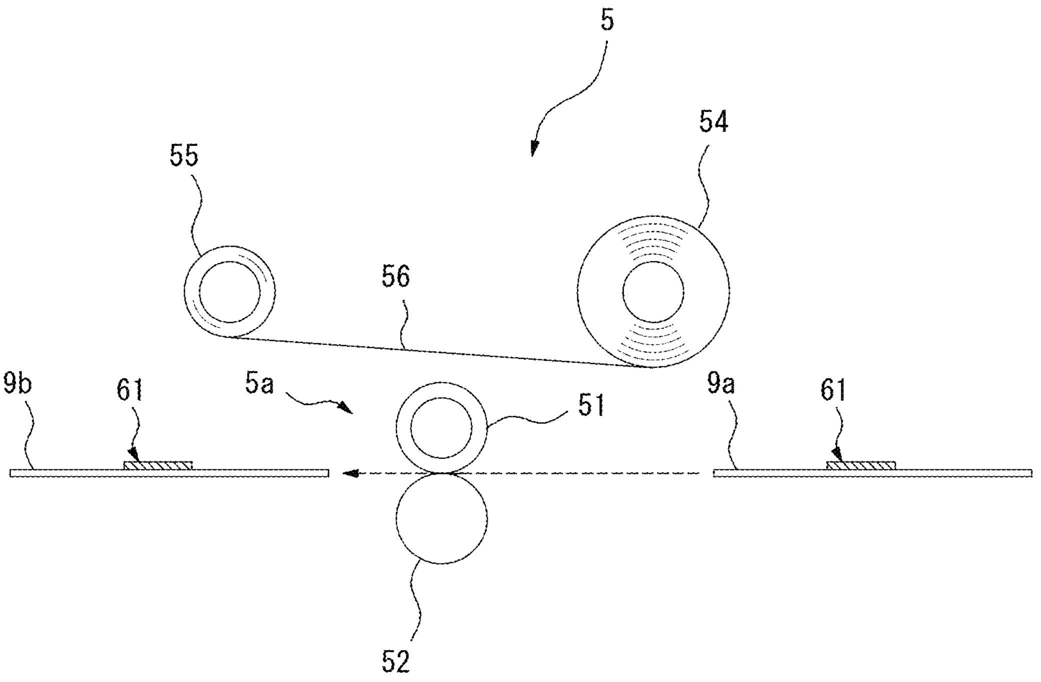
FIG. 5 illustrates an example when a recording medium to which only an ink is attached passes through the foil image forming unit.

Only the first image data D11 is contained in the image data D10. In this case, the job controller 84 may enable the fixing controller 88 to bring the foil image forming unit 5 (the fix unit 5*a*) into operation as well as terminating the operation of the toner image printing unit 3 as described above. FIG. 5 illustrates an example when the recording medium 9 to which only the ink 61 is attached passes through the foil image forming unit 5. As illustrated in FIG. 5, the heating process and the pressing process are conducted on the recording medium 9 to which only the ink 61 is attached when the recording medium 9 passes through the nip part between the heating roller 51 and the pressing roller 52. Due to the heating process and the pressing process, the ink 61 attached on the surface of the recording medium 9*a* gets dried. To be more specific, after passing through the foil image forming unit 5, the ink 61 attached to the recording medium 9*b* has already been dried. Occurrences of crumpled papers due to a leak of the ink 61 can be controlled, resulting in production of high-quality printed outputs.

As illustrated in FIG. 4C, even when the sheet material 56 is removed from the nip part between the heating roller 51 and the pressing roller 52, the job controller 84 is enabled to form the toner image on the recording medium 9. In this case, even when the sheet material 56 is removed, the job controller 84 brings each of the inkjet printing unit 2, the toner image printing unit 3 and the foil image forming unit 5 into operation. To be more specific, even when the sheet material 56 is removed from the nip part between the heating roller 51 and the pressing roller 52, the job controller 84 enables the foil image forming unit 5 (the fix unit 5*a*) to fix the toner image transferred to the recording medium 9 by the toner image printing unit 3 to the recording medium 9, and forms an image with the toner image.

It is assumed, for example, a color having a low visibility such as Y (yellow) is used as the toner color. In this case, the job controller 84 obtains the print data via the print data obtaining part 85, and prints the image based on the print data on the recording medium 9 by making the image inconspicuous.

The print data obtaining part 85 obtains the print data (data for printing) not contained in the image data D10 in the print job JB. The print data obtaining part 85 is brought into operation when the sheet material 56 is removed as illustrated in FIG. 4C and the second image data D12 is not contained in the image data D10 in the print job JB. The print data obtaining part 85 obtains the print data. The print data obtaining part 85, for example, obtains the device identification information 89 stored in the storage 82 as the print data. Besides the device identification information 89, the print data obtaining part 85 may obtain information such as information related to printed date and time as the print data. Once obtaining the print data, the print data obtaining part 85 outputs the print data to the job controller 84.

Figure 6:
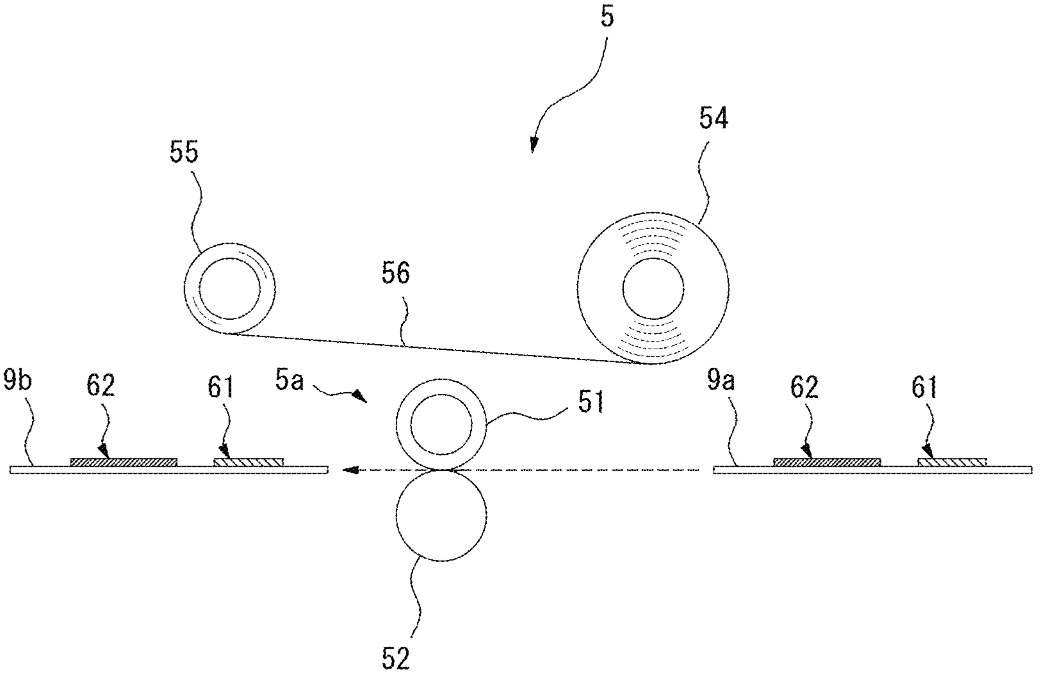
FIG. 6 illustrates an example when the recording medium to which the ink and a toner image are attached in different positions passes through the foil image forming unit.

Upon obtaining the print data from the print data obtaining part 85, the job controller 84 outputs the obtained print data to the toner image print controller 87. The job controller 84 forms the toner image on the recording medium 9 based on the print data. The job controller 84 forms the toner image in the margin in which the black and white image or the color image is not printed. FIG. 6 illustrates an example when the recording medium 9 to which the ink 61 and the toner image 62 are attached in different positions passes through the foil image forming unit 5. As illustrated in FIG. 6, the heating process and the pressing process are conducted on the recording medium 9*a* to which the ink 61 and the toner 62 are attached when the recording medium 9 passes through the nip part between the heating roller 51 and the pressing roller 52. The ink 61 attached to the surface of the recording medium 9*a* gets dried. The toner 62 attached to the surface of the recording medium 9*a* melts and is fixed to the recording medium 9*a*. The recording medium 9*b* after passing through the foil image forming unit 5 becomes a printed output to which the ink 61 and the toner 62 are fixed.

Figure 7:
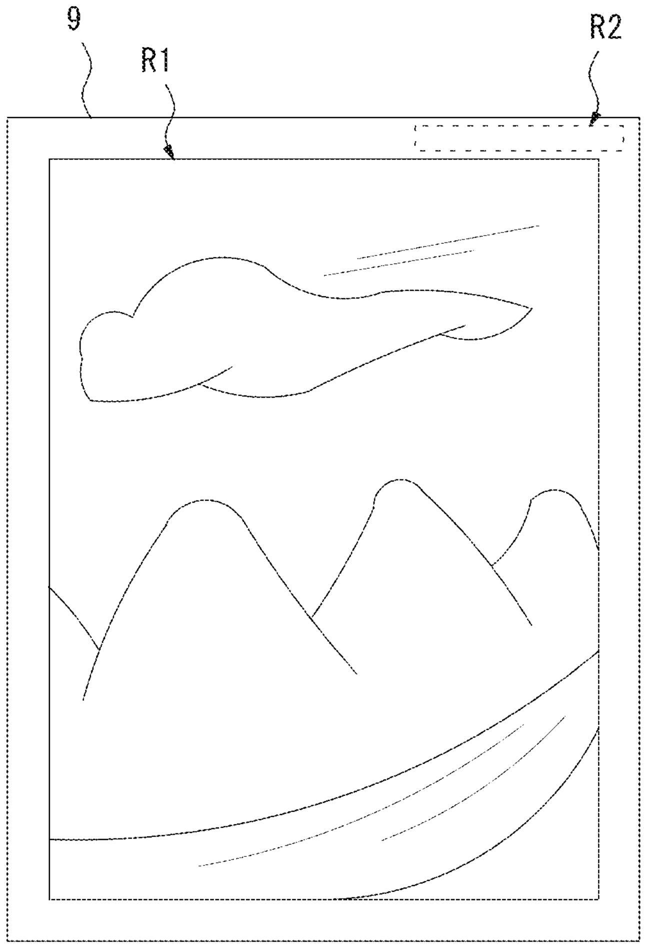
FIG. 7 illustrates an example of the recording medium on which the printing based on the print data is conducted.

FIG. 7 illustrates an example of the recording medium 9 on which the printing based on the print data is conducted. As illustrated in FIG. 7, the recording medium 9 includes an image area R1 in which the black and white image or the color image is printed based on the first image data D11 in the print job and a print data area R2 printed with the toner 62 having a low visibility. The print data printed in the print data area R2 can be recorded inconspicuously on the recording medium 9. The recording medium 9 can be produced as a printed output including the device identification information 89 and/or information such as the printed date and time without deterioration of image quality of the image area R1.

It is assumed, for example, the second image data D12 is contained in the image data D10 in the print job JB while the sheet material 56 is removed from the nip part between the heating roller 51 and the pressing roller 52 as illustrated in FIG. 4C. In this case, the job controller 84 may form the toner image based on the second image data D12. If the toner is in a color different from the ink 61 used by the inkjet printing unit 2 is stored in advance in the developing unit 36, for example, the image of the image quality that cannot be expressed only with the inkjet printing unit 2 can be printed on the recording medium 9.

As an example, when the colorless transparent polishing toner is used, the black and white image or the color image printed by the inkjet printing unit 2 is laid on top of the toner image so that the printed output having a polishing effect due to the toner image can be obtained. In this case, the toner image is transferred to the same area as the black and white image or the color image printed by the inkjet printing unit 2 in the second image data D12. When the second image data D12 is contained in the print job JB, the job controller 84 forms the toner image to lay on top of the black and white image or the color image based on the second image data D12.

Figure 8:
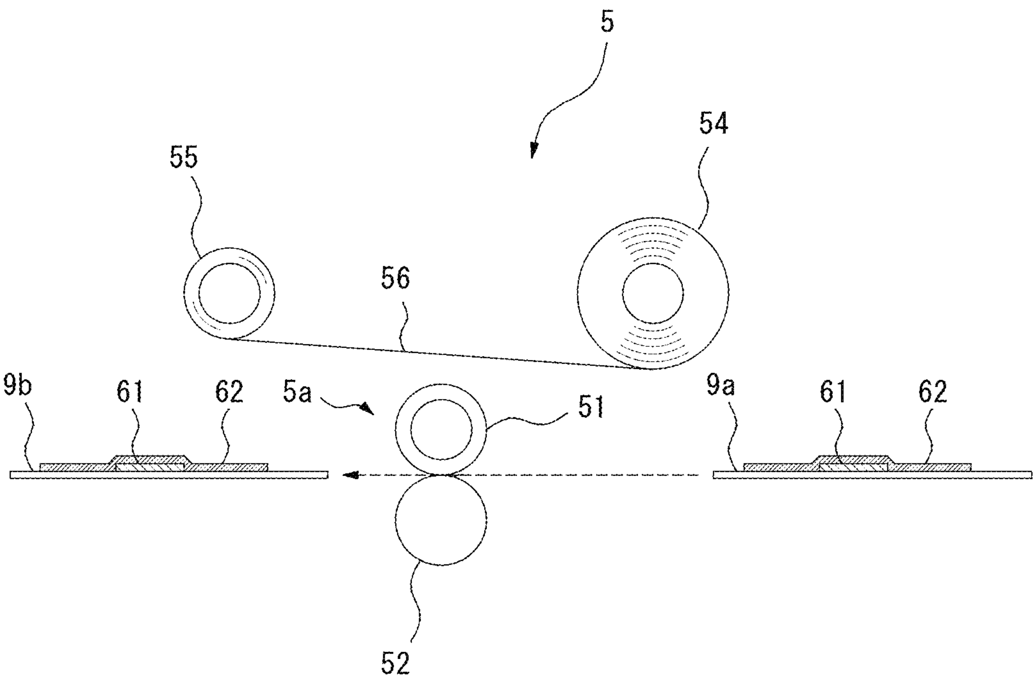
FIG. 8 illustrates an example when the recording medium to which the toner laid on top of the ink that forms the black and white image or the color image is transferred passes through the foil image forming unit.

FIG. 8 illustrates an example when the recording medium 9 to which the toner 62 laid on top of the ink 61 that forms the black and white image or the color image is transferred passes through the foil image forming unit 5. As illustrated in FIG. 8, the heating process and the pressing process are conducted on the recoding medium 9*a* to which the ink 61 and the toner 62 are attached when the recording medium 9*a* passes through the nip part between the heating roller 51 and the pressing roller 52. The ink 61 attached to the surface of the recording medium 9*a* gets dried. The toner 62 attached to the surface of the recording medium 9*a* is fixed to the recording medium 9*a*. Thus, the black and white image or the color image in ink 61 is having a topcoat of the toner 62 so that the surface of the black and white image or the color image in ink 61 is polished. The image with good appearance can be formed.

The toner 62 used for the toner image formed by the toner image printing unit 3 is a colored toner. The toner 62 may be a different color from the ink 61 used by the inkjet printing unit 2.

As described above, the image forming device 1 of the first embodiment is enabled not only to form the foil image at the same time as printing the black and white image or the color image on the recording medium 9 but also to form a variety of images using both of the ink 61 and the toner 62 on the recoding medium 9. Hence, the image forming device 1 of the first embodiment is a device that has a high convenience.

Second Embodiment

The second embodiment of the present invention is explained next. The image forming device 1 of the first embodiment is provided with the inkjet printing unit 2, the toner image printing unit 3 and the foil image forming unit 5 arranged in order from an upstream side of the carrying path P of the recording medium 9. The image forming device 1 of the second embodiment is provided with the inkjet printing unit 2 arranged in a position between the toner image printing unit 3 and the foil image forming unit 5.

Figure 9:
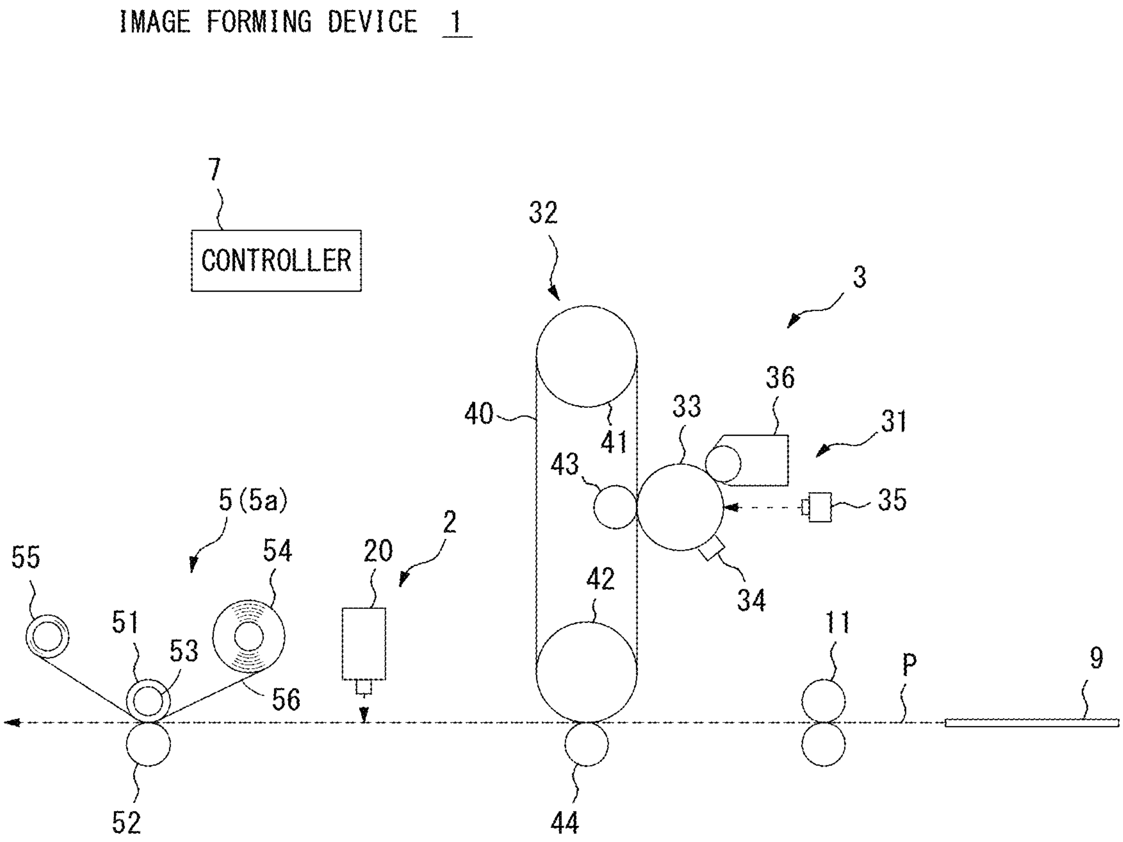
FIG. 9 illustrates an exemplary structure of the image forming device in which a second embodiment may be practiced.

FIG. 9 illustrates an exemplary structure of the image forming device 1 in which the second embodiment may be practiced. The image forming device 1 is provided with the toner image printing unit 3, the inkjet printing unit 2 and the foil image forming unit 5 arranged in order from an upstream side of the carrying path P of the recording medium 9. Hence, the toner image based on the second image data D12 is transferred at first when the recording medium 9 passes through the second position where the toner image printing unit 3 is arranged. The black and white image or the color image based on the first image data D11 is then printed when the recording medium 9 passes through the first position where the inkjet printing unit 2 is arranged. At last, the foil 71 is transferred to the toner image and the foil image is formed when the recording medium 9 passes through the third position where the foil image forming unit 5 is arranged. The image forming device 1 of the second embodiment is enabled to print the black and white image or the color image and to form the foil image as a series of operation with the single carrying of the recording medium 9 along the carrying path P as well as the first embodiment.

Everything else except for the above-described structure is the same as the first embodiment.

Third Embodiment

The third embodiment of the present invention is explained next. The image forming device 1 of the third embodiment is provided with the inkjet printing unit 2 at the further downstream side of the foil image forming unit 5.

Figure 10:
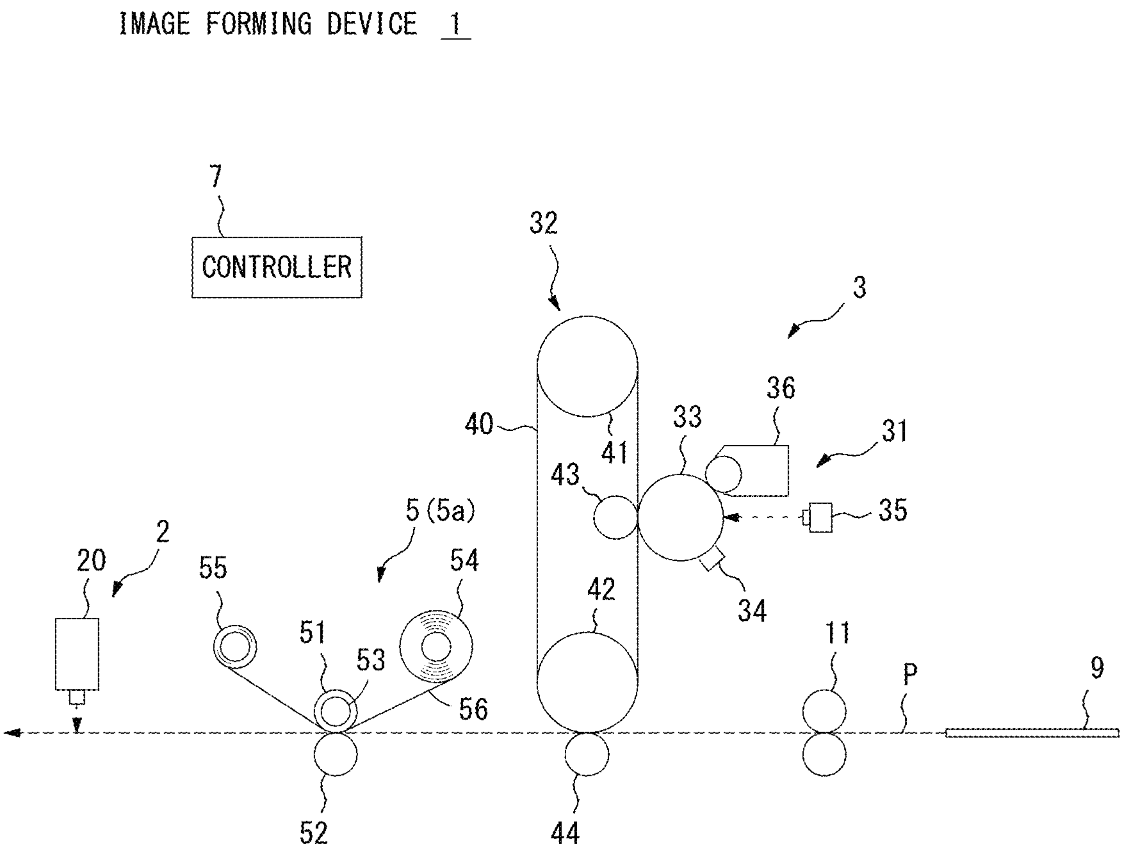
FIG. 10 illustrates an exemplary structure of the image forming device in which a third embodiment may be practiced.

FIG. 10 illustrates an exemplary structure of the image forming device 1 in which the third embodiment may be practiced. The image forming device 1 is provided with the toner image printing unit 3, the foil image forming unit 5 and the inkjet printing unit 2 arranged in order from an upstream side of the carrying path P of the recording medium 9. Hence, the toner image based on the second image data D12 is transferred at first when the recording medium 9 passes through the second position where the toner image printing unit 3 is arranged. The foil 71 is then transferred to the toner image and the foil image is formed when the recording medium 9 passes through the third position where the foil image forming unit 5 is arranged. At last, the black and white image or the color image based on the first image data D11 is printed when the recording medium 9 passes through the first position where the inkjet printing unit 2 is arranged. At last, The image forming device 1 of the third embodiment is enabled to print the black and white image or the color image and to form the foil image as a series of operation with the single carrying of the recording medium 9 along the carrying path P as well as the first embodiment. In the third embodiment, the black and white image or the color image is printed by the inkjet printing unit 2 after the foil image is formed. Thus, the black and white image or the color image can be laid on top of the foil image so that the image forming device 1 of the third embodiment is enabled to form the image that cannot be produced in the first or the second embodiment on the recording medium 9.

Everything else except for the above-described structure is the same as the first or the second embodiment.

Modifications

While the embodiments of the present invention have been described above, the present invention is not limited to the embodiments. Various modifications may be applied to the present invention.

For forming two kinds of foil images, a gold foil image and a silver foil image, on the recording medium 9, for example, the image forming device 1 may be provided with two pairs of the aforementioned toner image printing unit 3 and foil image forming unit 5 along the carrying path of the recording medium 9. The first pair of the toner image printing unit 3 and the foil image forming unit 5 to form the gold foil image may be arranged at upstream side of the second pair of the toner image printing unit 3 and the foil image forming unit 5 or at downstream side of the second pair of the toner image printing unit 3 and the foil image forming unit 5.

In the above-described embodiments, the fix unit 5*a* is constructed by the single pair of rollers that are the heating roller 51 and the pressing roller 52. The fix unit 5*a* is not necessarily constructed by the single pair of rollers. The fix unit 5*a* may include, for instance, an endless fixing belt. The fix unit 5*a* may press the recoding medium 9 to the fixing belt to fix the toner image.

What is claimed is:

1. An image forming device comprising:

a receiving part that receives image data containing first image data relating to a black and white image and second image data relating to a foil image;

a carrying path along which a recording medium is carried in a predetermined direction;

an inkjet printing part, arranged on the carrying path, injects an ink based on the first image data to the recording medium carried along the carrying path, and forms the black and white image or the color image on the recording medium;

a toner image printing part, arranged on the carrying path, forms the toner image for adhesion based on the second image data, and transfers the toner image to the recording medium; and a foil image forming part, arranged on the carrying path, enables the toner image transferred to the recording medium to melt and attaches the foil to the melted toner image to form the foil image;

wherein the foil image forming part includes a nip defined between a heating roller and a pressing roller configured to pass the recording medium including the toner image and a sheet material including the foil therethrough, the nip configured to heat and press the sheet material to the recording medium to attach the foil to the toner image and release the foil from the sheet material; and wherein the heating roller is movable to remove the sheet material from between the heating roller and the pressing roller, such that the nip heats and presses the toner image on the recording medium to form an image based on the toner image on the recording medium.

2. The image forming device according to claim 1, wherein the foil image forming part uses a toner in a color different from the ink used by the inkjet printing part to form the toner image.

3. The image forming device according to claim 1, further comprising:

a hardware processor that obtains data, which is not contained in the image data, to print on the recording medium, wherein the toner image printing part forms the toner image based on the obtained data.

4. The image forming device according to claim 1, wherein the sheet material is enabled to be removed from the fix part, the foil image forming part dries and fixes the black and white image or the color image formed by the inkjet printing part at time the sheet material is removed from the fix part.

5. The image forming device according to claim 1, wherein the inkjet printing part is arranged at an upstream side of the toner image printing part on the carrying path.

6. The image forming device according to claim 1, wherein the inkjet printing part is arranged at a downstream side of the toner image printing part on the carrying path.

7. The image forming device according to claim 1, wherein the inkjet printing part is arranged at a downstream side of the foil image forming part on the carrying path.

* * * * *